Aug. 5, 1958     J. O. LOWELL     2,846,001
SHOE CUTTING DIE
Filed May 6, 1957
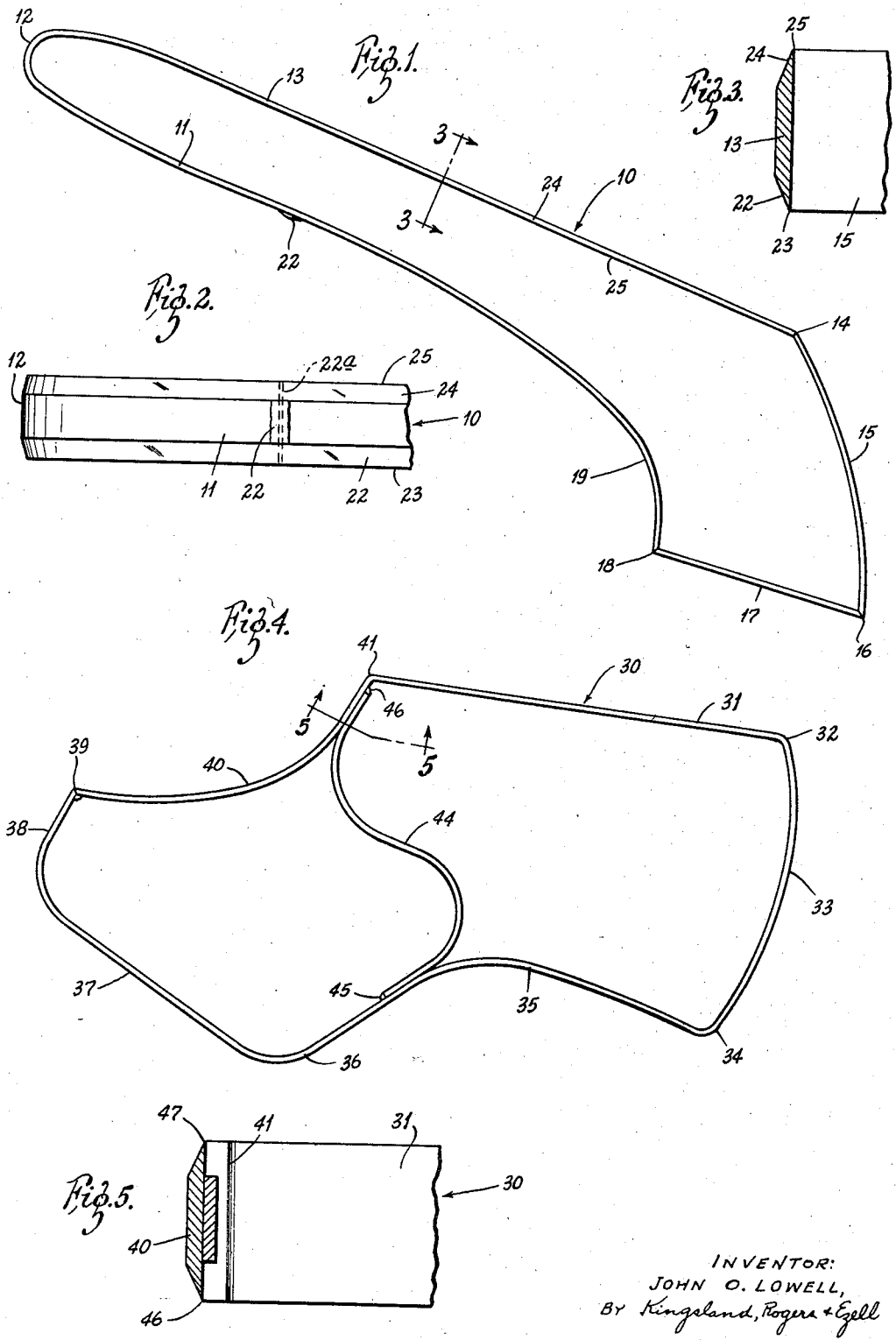
INVENTOR:
JOHN O. LOWELL,
BY Kingsland, Rogers & Ezell
ATTORNEYS

United States Patent Office 2,846,001
Patented Aug. 5, 1958

2,846,001

SHOE CUTTING DIE

John O. Lowell, Kirkwood, Mo., assignor, by mesne assignments, to Joab, Inc., St. Louis, Mo., a corporation of Missouri Application May 6, 1957, Serial No. 657,395

11 Claims. (Cl. 164—29)

The present invention relates to a shoe cutting die. It can be used for cutting other similar materials but its advantages and novelties can be quickly understood when it is explained in connection with cutting materials such as the leather used for shoe uppers. Other materials that can be cut, however, by this type of die, include certain fabrics, other stiffer leathers, synthetic materials and the like.

Basically, the present invention comprises a resilient cutting die. Heretofore, dies of this type have been made of strip like material, and are designed to be rigid and inflexible. Clicker dies, for example, that are subjected to the impact of the head of a die press machine for cutting material laid upon a block, have been made as rigid as possible under all the circumstances. This has been done on the theory that only then can they withstand the repeated impacts and the forces applied to them, by the press head as it hits them, forces them through the material, and impresses them into the block.

Bracing has been used to increase the rigidity. Heavy sections have been used to increase the rigidity. As a matter of conventional practice, tool steel alloys of great rigidity and impact resistance have been used.

The present invention proceeds in exactly the opposite direction. Contrary to all prior practices, this invention provides a resilient die. The sections are comparatively thin. The bracing, if it be necessary at all, is resilient. The material used is resilient, true, high-carbon spring steel, initially annealed so that it can be formed, and finally heat treated, so that it has a controlled degree of resilience.

Another particular feature of the present invention is that its resiliency is even, over all the die, in the sense that the die is of uniform material throughout. Where bracing is necessary, the bracing is made of material of the same composition as that of the die itself. The weld has the same material and, where rod welding is used, the deposit from the rod has the same composition as the die strip itself.

An additional feature of the present invention is that the cutting edge is continuous, even across the weld. Heretofore, certain pre-tempered steels have been used, that cannot be successfully welded without changing their character adjacent the weld. Hence they have been welded only in areas well-inward from the cutting edge, so as not to reduce the temper of the cutting edge. This, however, leaves a discontinuous cutting edge. The present die is welded entirely across, including the edge, and yet it provides a uniform, tempered composition throughout.

The die must have a controlled resilience in which it can yield, if necessary, to the impact forces of the press, but without taking permanent deformation. It must not take a permanent set even by repeated applications of force that depart from the true vertical, and could warp the die so that its walls are not vertical.

Repeated impacts on rigid dies cause a high percentage of failures. Actual tests have proved that the present die will take many times as many impacts; and in a certain specific test, dies made according to this invention operated with a breakage factor of about .1 of 1%, as against an accepted average breakage of 6%.

Another advantage of the present dies is that the familiar alloys used in tool steel have been eliminated. Pure carbon makes better cutting edges, and with high-carbon spring steel, the cutting edges last several times as long, without resharpening. The normal resharpening factor is to resharpen after the 50–100 thousand cuts; but tests have shown that with the present dies, there is practically no resharpening.

This application is related to the disclosure of application No. 487,495, in the name of Barnett M. Brownell, Patent No. 2,791,273.

The objects of the invention include the provision of a die for the purposes described, having resilience, but resilience in controlled degree; the provision of a die that is of uniform homogeneous material; the provision of a die that, where braced, includes bracing of the same material as the die itself so that its force reaction is uniform throughout the die, and a die wherein the welds themselves are metallurgically the same as the material of the die. Another object is a die of high-carbon steel with a continuous cutting edge. Other objects include novel process features employed in the manufacture of such dies. Additional objects will appear from the description to follow.

In the drawings:

Figure 1 is a plan view of an unbraced die manufactured in accordance with the present invention;

Figure 2 is an elevation of a portion of the die looking from the outside toward the weld between the ends of the strip;

Figure 3 is a section through the die taken on the line 3—3 of Figure 1;

Figure 4 is a view of a braced die made in accordance with the present invention; and Figure 5 is a transverse section on the line 5—5 of Figure 4.

Referring particularly to the die 10 shown in Figure 1, which is shown for illustration only, it comprises a strip of material. This is shown as having an elongated portion 11 with a fairly sharply rounded end 12, and another elongated portion 13 more or less parallel to the section 11. There follows a corner 14, a somewhat curved end section 15, a corner 16, a portion 17, a corner 18, and a concave section 19 that joins the section 11. As illustrated, this is a double-edged die although it will be understood that the principles hereof can be used on either a double-edged or single-edged die. With a double-edged die, there is a lower bevel 22 providing a lower cutting edge 23, and an upper bevel 24 providing an upper cutting edge 25.

The die is preferably formed from a single strip of material. Its ends are normally joined together by a weld. Such a weld is indicated at 27, the dotted lines 27a in Figure 2 representing the location formerly occupied by ends of the strip, prior to the weld. In Figure 2 the weld metal surplus has been ground off.

A somewhat different die is illustrated in Figures 4 and 5 simply because it shows a die that may require some degree of bracing. This die is generally indicated at 30. It includes an upper, more or less straight portion 31 leading to a corner 32, a back line 33, a lower corner 34, a concave section 35 leading to a curved bend 36, a bottom portion 37, leading to a toe portion 38 and a junction 39. From the junction a concave portion 40 leads to a bend 41 connected to the upper strip 31. In this the two ends of the strip are welded together at the corner 39.

An S-shaped brace 44 has its ends welded as at 45 and 46 to opposite parts of the strip such as the parts 35 and 40. This strip 44, as is shown by Figure 5 is somewhat narrower than the main strip, so that it is contained between the beveled cutting edges 46 and 47. Consequently, the brace 44 will not hit the material being cut. The sharper the curvature of the brace the more resilient it is. Other shapes of bracing may be used, such as U, C, Z, and oval shapes, in addition to the S shape illustrated.

It is very important that the materials used in making these dies be true, high-carbon, spring steel, of at least .70% carbon, in contrast to the characteristic low-alloy, tool steel, such as heretofore used for these devices, which is below about .60% carbon. It has been discovered by experimentation that suitable material is high-carbon spring steel of an AISI rating that should be higher than 1070, and it should be below 1.00 carbon (AISI 1090). The most desirable that have been discovered are AISI 1080 or 1083 which have approximately .75 to .85 carbon and a small percentage of other alloy materials in accordance with formulations set by the Institute. The 1070 has .65–.75 carbon, .70–1.00 manganese, .040 phosphorous and less than .050 sulfur. The 1080 differs only in having .75–.88 carbon.

An AISI steel as low as 1060 is resilient but it tends to cock out of shape by warping into slanting positions relative to the block, upon repeated impacts that are not directly vertically applied to it. A 1070 has been found usable but still has some tendency to cock out of shape. It has also been found that steel as high as SAE 1090 works, but that is about the maximum because of the tendency to fracture, especially at the welds, under repeated impacts, and because it becomes more difficult and costly to weld. The AISI 1080 and 1083 have proved satisfactory, being not subject to cocking or warping out of shape, but not so rigid that they tend to fracture, especially at the welds, and indicating nicks, upon repeated impact.

The thickness has been found to be best at approximately .083 inch. Experimentation has indicated a die made of .050 inch material has an undesirable tendency to bounce. In other words, it is so resilient that it tends to bounce out of position on the block when the impact blow is struck against it. In similar fashion, a die made of strip having a thickness of .090 inch proved to have a tendency to jump, perhaps because of its being so stiff.

The .083 inch thickness has proved to be entirely satisfactory. The dies have been made using the typical heights of 9/16 and 3/4 inch and 1¼ inches.

The method of making the die includes starting with the true, high-carbon spring steel strip annealed but not heat-treated. It is formed by conventional methods into the desired shape. The ends are welded together by conventional methods such as by a gas flame weld. However, the rod material added to the weld must be one that does not alter the composition of the metal adjacent the weld. It has been found that it is desirable to use a rod of the same composition as the strip, but with an added 5% carbon, because some of the carbon is burned out of the rod material in the welding process.

The brace, where it is used, also has the same composition as the parent metal of the strip and is welded on prior to tempering the material.

After the die is thus shaped, it is given a preliminary grind, assuming that the original strip had no preliminary bevels. Thereafter, it is given a heat treatment. A desirable heat treatment includes, preferably, the step of pre-heating to about 400°–700° F. although this step is not always essential. It is immersed in neutral salts for about 8 minutes at 1445° F. so as to heat it through thoroughly. If other heating medium is used, the temperature may be correspondingly adjusted. For example, where air heating is used, the air should be at about 1470°. After the heating, the article is quenched in oil at not greater than 150° F. and finally is tempered for 30 minutes at 680°–720° F. The degree of resiliency is regulated by the temperature of the tempering medium, but in any case, the article is by no means rigid, but is definitely flexible. For example, a die such as that shown in Figure 1, which is about 8 inches long, can have its parallel sides squeezed together about a quarter of an inch by ordinary hand-squeezing pressure. Typically, a strip of material ¾ inch wide and shaped into a double-edge die projecting 6 inches from a vise, will deflect 2½ inches under the steady 25 pound load applied transversely to its free end and will quickly return to its original shape when the load is released. However, it is entirely resilient and quickly resumes its original shape when the impact is released. Under normal die-press usage, these dies may deform .9–.12%, and will return to original shape upon relief of load.

It is to be emphasized that the process and the materials used produce a die which is of uniform material throughout, including the welds. Heretofore dies that have been made of steel, such as Swedish tempered steel, have been brittle in the welds and not resilient to anything like the same degree as those of the present invention. Further, those dies do not have a continuous cutting edge, because welding the cutting edge area de-tempers the steel.

What is claimed is:

1. A resilient die for cutting materials such as shoe components and the like, comprising a strip of true initially annealed, high-carbon spring steel that is hardened and tempered and that readily yields to impact pressures of a die press and returns to its original shape upon relief of the pressures.

2. The device of claim 1 wherein the strip is a true, high-carbon spring steel of approximately AISI 1070 to AISI 1090, and of a thickness greater than .050 inch and less than about .090 inch.

3. A process of making dies and the like comprising the steps of shaping a strip of annealed, true, high-carbon, spring steel, to the shape of the desired die, welding the ends of the strip together, heat treating the thus formed article and tempering the same so that it is resilient without being brittle, and forming at least one cutting edge on the strip.

4. The process of claim 3, wherein the weld extends entirely across the strip, so that the cutting edge is continuous across the weld.

5. The process of claim 3, including the step of tempering the material by subjecting it to a heat of from 680°–720° F. thereby to regulate its resiliency.

6. The resilient die of claim 1, wherein the steel has at least about .70% carbon.

7. The resilient die of claim 1, wherein the steel consists of at least about .70% carbon, about .70–1.00% manganese, less than .1% phosphorous and less than .1% sulfur.

8. The resilient die if claim 1, wherein the thickness of the strip is not greater than about .090 inch.

9. A clicker or like die, as defined in claim 1, comprising high carbon spring steel of at least about .80 carbon.

10. A clicker or like die, as defined in claim 1, comprising a strip of spring steel of approximately AISI 1070 to AISI 1090 grade.

11. A clicker or like die, as defined in claim 1, comprising a strip of spring steel of approximately AISI 1083 grade.

References Cited in the file of this patent

UNITED STATES PATENTS

| | | |
|---|---|---|
| 1,056,448 | Pocock | Mar. 18, 1913 |
| 1,115,079 | Lynch | Oct. 27, 1914 |
| 2,191,709 | Dedrick | Feb. 27, 1940 |
| 2,211,213 | Lindholm | Aug. 13, 1940 |
| 2,334,379 | Bolston | Nov. 16, 1943 |
| 2,791,273 | Brownell | May 7, 1957 |
| 2,817,981 | Brownell | Dec. 31, 1957 |